(12) United States Patent
Koeppl

(10) Patent No.: US 10,565,441 B2
(45) Date of Patent: Feb. 18, 2020

(54) POSITIONING DEVICE AND METHOD FOR POSITIONING PERSONS TO BE SCANNED

(71) Applicant: Rohde & Schwarz GmbH & Co. KG, Munich (DE)

(72) Inventor: Josef Koeppl, Zachenberg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 159 days.

(21) Appl. No.: 15/382,932

(22) Filed: Dec. 19, 2016

(65) Prior Publication Data
US 2018/0173943 A1  Jun. 21, 2018

(51) Int. Cl.
| | |
|---|---|
| *G06K 9/00* | (2006.01) |
| *G06K 9/62* | (2006.01) |
| *G06T 3/40* | (2006.01) |
| *G06K 9/78* | (2006.01) |
| *G06F 3/14* | (2006.01) |
| *A47G 1/02* | (2006.01) |
| *G09G 5/377* | (2006.01) |

(52) U.S. Cl.
CPC ........... *G06K 9/00369* (2013.01); *A47G 1/02* (2013.01); *G06F 3/14* (2013.01); *G06F 3/1415* (2013.01); *G06K 9/6202* (2013.01); *G06K 9/6215* (2013.01); *G06K 9/78* (2013.01); *G06T 3/40* (2013.01); *G09G 5/377* (2013.01); *G09G 2340/125* (2013.01); *G09G 2360/10* (2013.01)

(58) Field of Classification Search
CPC ........ A47G 1/02; G06F 3/14; G06K 9/00369; G06K 9/6202; G06K 9/6215; G06K 9/78; G09G 2340/125; G09G 5/377
See application file for complete search history.

(56) References Cited

U.S. PATENT DOCUMENTS

| | | | | |
|---|---|---|---|---|
| 8,062,220 B2* | 11/2011 | Kurtz | ................. | A61B 5/0064 600/301 |
| 9,998,712 B2* | 6/2018 | Yasukawa | ................ | H04N 7/18 |
| 2004/0077975 A1* | 4/2004 | Zimmerman | ......... | A61B 5/1116 600/595 |
| 2005/0272564 A1* | 12/2005 | Pyles | ................. | A63B 22/0257 482/54 |
| 2013/0076487 A1* | 3/2013 | Evers | ................. | G06K 9/00369 340/5.83 |
| 2014/0198962 A1* | 7/2014 | Anabuki | ............... | G06T 7/0014 382/128 |

* cited by examiner

*Primary Examiner* — James M Pontius
*Assistant Examiner* — Tyler B Edwards
(74) *Attorney, Agent, or Firm* — Potomac Technology Law, LLC

(57) ABSTRACT

A positioning device for positioning a person is provided. The positioning device comprises a camera, adapted to record an image of the person, a posture determiner, adapted to determine a posture of the person from the recorded image of the person, a posture comparer, adapted to compare the determined posture of the person to an ideal posture and determine a difference between the determined posture of the person and the ideal posture. Finally, the positioning device comprises a display, adapted to display the difference between the determined posture and the ideal posture, determined by the posture comparer.

14 Claims, 5 Drawing Sheets

POSITIONING DEVICE AND METHOD FOR POSITIONING PERSONS TO BE SCANNED

TECHNICAL FIELD

The invention relates to devices and methods for positioning persons by technical means, such as positioning persons to be scanned by a body scanner.

BACKGROUND

In recent years, body scanners have been increasingly used at security checkpoints, for example at airports. In such body scanners, the positioning of the person to be scanned is of great importance. With specific positions or postures of the person to be scanned, it is for example possible to conceal prohibited items. It is therefore very important to make sure that the person to be scanned is scanned in a suitable position or posture. Conventionally, this is assured by a body scanner operator, who instructs the person to be scanned to assume a specific position or posture. This leads to the necessity of having an operator present and also leads to a long scanning time for each individual person to be scanned. Also, this increases the number of false alarms due to incorrect scanning positions or postures of persons to be scanned.

For example the US patent application US 2013/0076487 A1 shows such a body scanner. The system and method shown there exhibit the above-mentioned disadvantages.

Accordingly, there exists a need to provide approaches for positioning a person's body by technical means, such as in a scanning device, without requiring the involvement of operating personnel and requiring only a small amount of time for positioning the person.

SUMMARY OF EXAMPLE EMBODIMENTS

Embodiments of the present invention advantageously address the foregoing requirements and needs, as well as others, by providing devices and methods for positioning a person's body by technical means, such as in a scanning device, without requiring the involvement of operating personnel and requiring only a small amount of time for positioning the person.

According to a first aspect of the invention, a positioning device for positioning a person is provided. The positioning device comprises a camera, adapted to record an image of the person, a posture determiner, adapted to determine a posture of the person from the recorded image of the person, a posture comparer, adapted to compare the determined posture of the person to an ideal posture and determine a difference between the determined posture of the person and the ideal posture. Finally, the positioning device comprises a display, adapted to display the difference between the determined posture and the ideal posture, determined by the posture comparer. The person to be scanned therefore can see if the posture is correct and adjust the posture accordingly. This allows for a very quick positioning of the person in a correct posture and does not require the involvement of operating personnel.

According to a first example embodiment of the first aspect, the positioning device comprises a database which stores a plurality of ideal posture templets for different body shapes. The positioning device moreover comprises an ideal posture determiner, which is adapted to compare the posture of the person determined by the posture determiner to the plurality of ideal posture templets stored in the database and determine the ideal posture as the ideal posture templet of the plurality of ideal posture templets best matching the posture of the person determined by the posture determiner. This allows for taking different body shapes of persons into account. Finally, this leads to an increased accuracy of the positioning.

According to a second example embodiment of the first aspect, the positioning device moreover comprises a scaler, which is adapted to, before comparing the posture of the person to the plurality of ideal posture templets, by the ideal posture determiner, scale the posture of the person, determined by the posture determiner to best match the plurality of ideal posture templets or scale the plurality of ideal posture templets to best match the posture of the person, determined by the posture determiner. This allows for a further increase in positioning accuracy.

According to a third example embodiment of the first aspect, the display is a liquid crystal display or a light-emitting diode display or an organic light-emitting diode display or a holographic display or a projected image display. This allows for a simple construction of the positioning device.

According to a fourth example embodiment of the first aspect, the display is integrated into a semi-transparent mirror, arranged so that the person can see his or her reflection in the semi-transparent mirror while seeing the difference between the determined posture and the ideal posture. This allows for an even more intuitive positioning for the person to be positioned.

According to a fifth example embodiment of the first aspect, the posture comparer is adapted to determine if the determined difference between the determined posture of the person and the ideal posture is smaller than a threshold or larger than the threshold, determine a posture match, if the determined difference between the determined posture of the person and the ideal posture is smaller than the threshold and determine a posture mismatch if the determined difference between the determined posture of the person and the ideal posture is larger than the threshold. This allows for a very simple determination, if the positioning is complete or not.

According to a sixth example embodiment of the first aspect, the display is adapted to display a first symbol in case of a posture match and display a second symbol in case of a posture mismatch. This allows for a very simple display, if the positioning is complete.

According to a seventh example embodiment of the first aspect, the display is adapted to display the recorded image of the person, display the ideal posture, display an outline of the person in the recorded image of the person or an outline of the ideal posture in a first color, preferably green, in case of a posture match, and display an outline of the person in the recorded image of the person or an outline of the ideal posture in a second color, preferably red, in case of a posture mismatch. This allows for an especially intuitive to grasp display if the positioning is complete.

According to an eighth example embodiment of the first aspect, the display is adapted to display an outline of the person in a first color, preferably green, in case of a posture match, and display the difference between the determined posture and the ideal posture determined by the posture comparer in a second color, preferably red, in case of a posture mismatch. This also allows for a very intuitively graspable display if the positioning is complete.

According to a second aspect of the invention, a body scanning system for scanning a person is provided. The body scanning system comprises a body scanner and a positioning device according to the first aspect. The positioning device is adapted to position the person to be scanned in a position ideal for scanning by the body scanner. The body scanner is adapted to scan the body of the person. This allows for a very simple to operate body scanning system.

According to a first example embodiment of the second aspect, the display is integrated into a scan array of the body scanner. This allows for a very compact construction of the body scanning system.

According to a second example embodiment of the second aspect, the display is a separate positioning display arranged so that this is visible from a position of a person being scanned. This allows for a very simple construction of the body scanning system.

According to a third example embodiment of the second aspect, the body scanner is adapted to instruct the positioning device to successively position the person to be scanned in a number of different postures, and scan the body of the person in each of the postures of the number of postures. The positioning device is then adapted to successively position the person in the number of different postures, as instructed by the body scanner, by using different ideal postures for the number of different postures. This allows for a very quick scanning while at the same time achieving a very high accuracy of the scans due to the different scanning postures.

According to a fourth example embodiment of the second aspect, the display of the positioning device is adapted to display a number of remaining postures of the number of different postures, the body scanner needs to perform scans in. This allows for an increase in cooperation by the person to be scanned and therefore decreases the scanning time, while increasing the scanning accuracy.

According to a third aspect of the invention, a method for positioning a person is provided. The method comprises recording an image of the person, determining a posture of the person from the recorded image of the person, comparing the determined posture of the person to an ideal posture, determining a difference between the determined posture of the person and the ideal posture, and displaying the difference between the determined posture and the ideal posture. The person therefore can see if the posture is correct and adjust the posture accordingly. This allows for a very quick positioning of the person in a correct posture and does not require the involvement of operating personnel.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION OF EXAMPLE EMBODIMENTS

Devices and methods for positioning a person's body by technical means, such as in a scanning device, without requiring the involvement of operating personnel and requiring only a small amount of time for positioning the person, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

First, the construction and function of a positioning device according to different example embodiments of the present invention are described with reference to FIGS. 1-3. Then, the construction of a body scanning system and of the positioning device according to example embodiments of the present invention are described in detail with reference to FIG. 4. Lastly, the function of a positioning method example embodiments of the present invention is described with reference to FIG. 5. Similar entities and reference numbers in different figures have been partially omitted.

Reference will now be made in detail to example embodiments of the present invention, examples of which are illustrated in the accompanying drawings. However, the following embodiments of the present invention may be variously modified and the range of the present invention is not limited by the following embodiments.

First Embodiment

Figure 1:
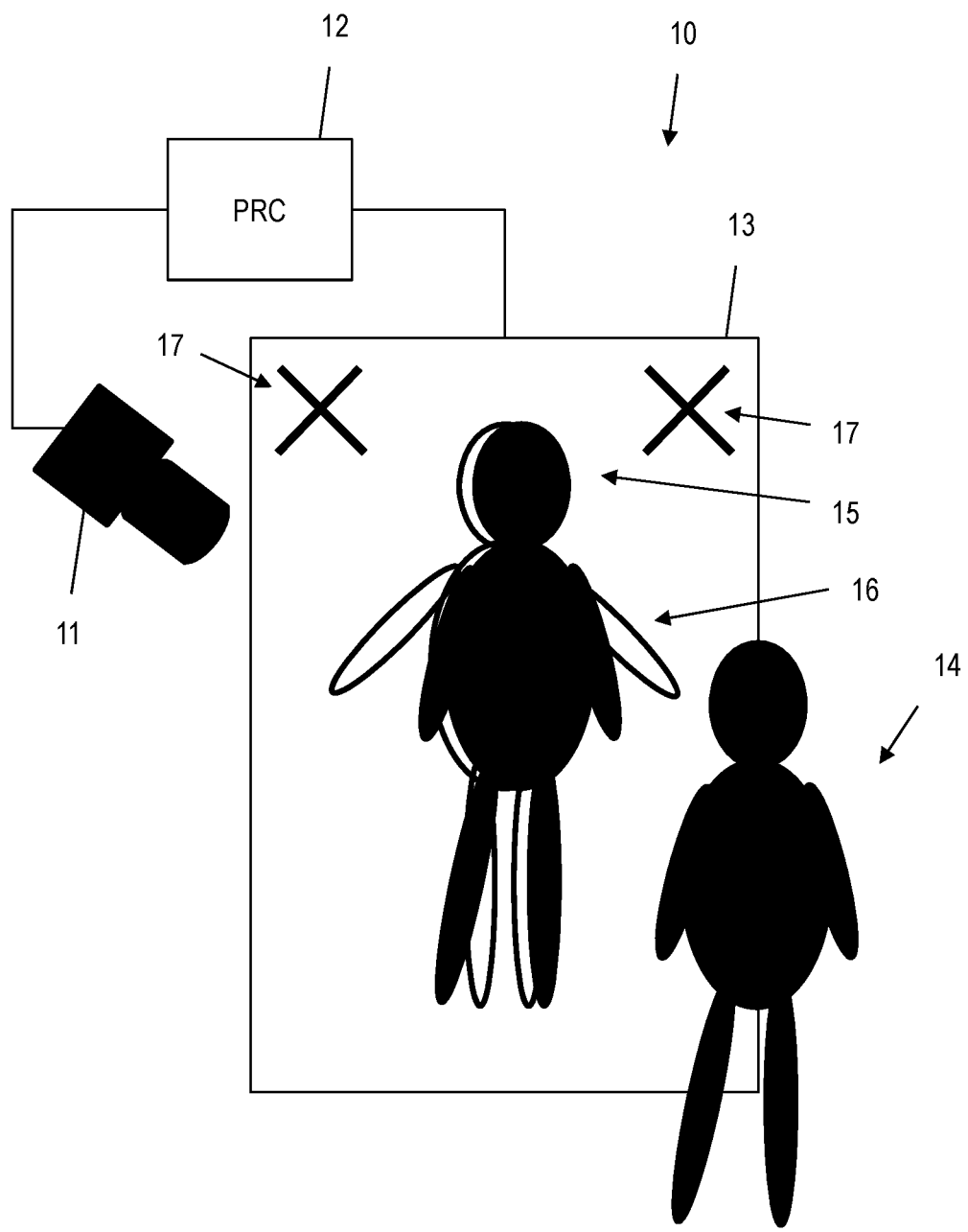
FIG. 1 shows a first embodiment of a positioning device according to the first aspect of the invention.

FIG. 1 shows a first embodiment of a positioning device 10 according to the first aspect of the invention. The positioning device 10 comprises a camera 11, a processing unit 12 and a display 13.

With reference to FIG. 1, a person to be positioned 14 is standing opposite to the display 13. The camera 11 records an image of the person to be positioned 14 and hands it to the processing unit 12. The processing unit 12 determines a position or posture of the person from the recorded image of the person and compares it to a target position 16. A difference between the determined position and the target position is determined. This difference is compared to a threshold. In case the difference is below the threshold, a match is detected. In case the difference is larger than the threshold, a mismatch is detected. In the example shown here, a mismatch is detected. This can clearly be seen since the image of the person 15 and the target position 16 clearly do not match. This is visualized on the display 13 by symbols 17 and the display of the image of the person 15 and the target position 16.

Also it is possible to visualize this by merely displaying the difference of the target position to the determined position of the person to be positioned 14. In order to increase the clarity of the displayed decision, it is possible to use colors. For example, the symbol 17 can be displayed in red. In case of a match, a different symbol 18, as shown in FIG. 2 can be used. This symbol could then by displayed in green. Also, in order to increase the clarity of displaying the match or mismatch decision, the difference between the determined position and the target position 16 can be displayed in red in case of a mismatch. In case of a match, the target position 16 can be displayed for example in green. Also it is possible to display the image of the person to be positioned 15 in green.

The display is a liquid crystal display or a light-emitting diode display or an organic light-emitting diode display or a holographic display. Also the use of a projected image is possible, for example using a laser beamer.

Second Embodiment

Figure 2:
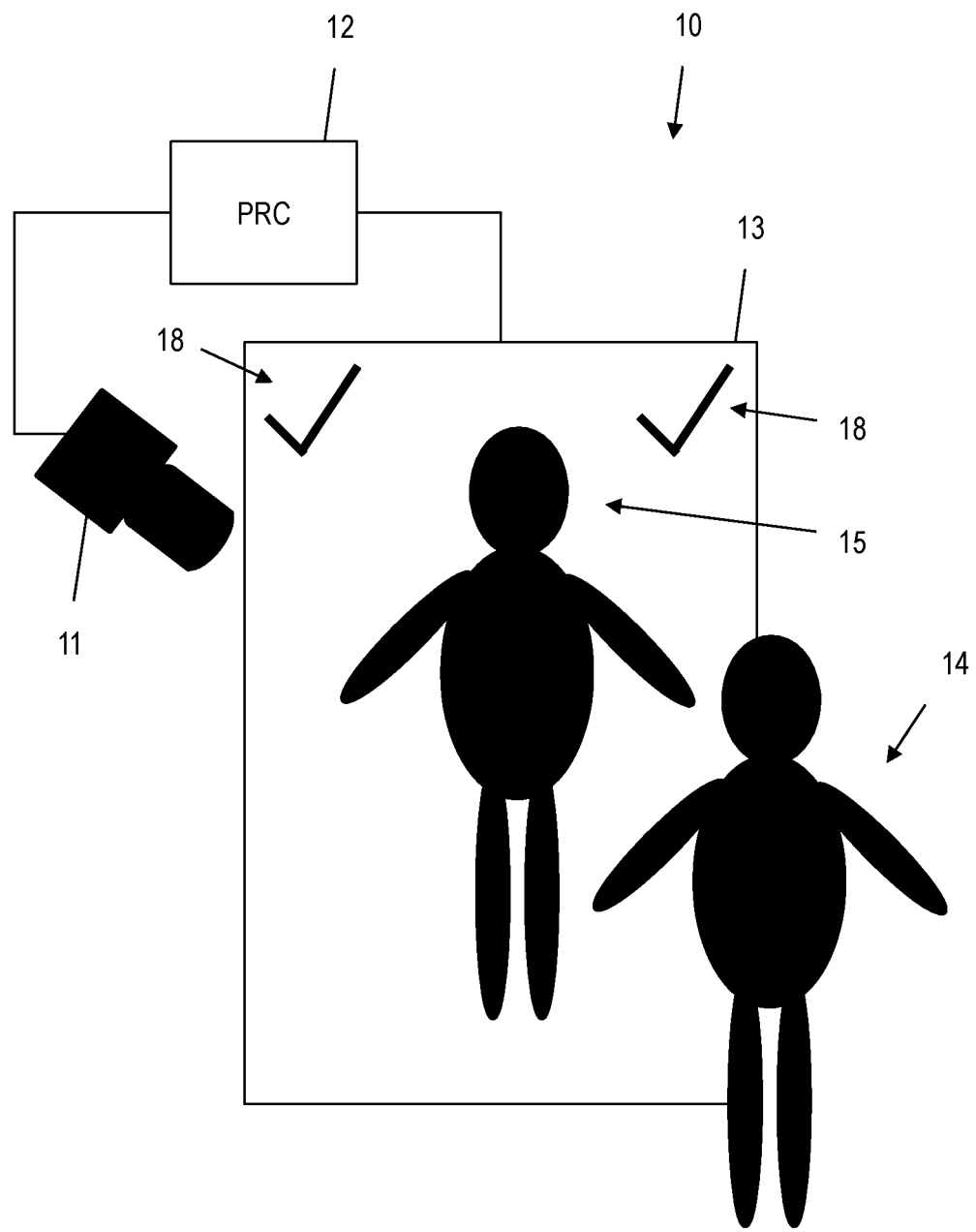
FIG. 2 shows a second embodiment of a positioning device according to the first aspect of the invention.

FIG. 2 shows a second embodiment of a positioning device 10 according to the first aspect of the invention. Only differences to the embodiment of FIG. 1 are explained here. The situation of a person to be positioned 14 having assumed a suitable position is shown in FIG. 2. The person to be positioned 14 has assumed a posture or position, which is close enough to the target position 16 shown in FIG. 1, such that the difference between the determined position and the target position is below the threshold. This is shown by use of the symbols 18 and for example by displaying the image of the person to be positioned 15 in green or with a green outline. Also it is possible to display the determined position with a green outline.

Third Embodiment

When positioning a large number of different persons, a large plurality of different body shapes can occur. Since the body shapes throughout the population vastly differ, it is difficult to use a single target posture or position for all body types and shapes of the persons to be positioned.

Therefore, according to further embodiments, the positioning device stores a number of different target posture or position templets for different body shapes, for example in a database. After determining the position of a person to be positioned, before comparing the position of the person to be positioned to a target position, a desired target position is first selected from the plurality of target position templets from the database.

This is done by comparing the determined position of the person to be positioned to all target position templets. Additionally, it is possible to perform a scaling of the determined position or to perform a scaling of the target position templets before performing the comparison in order to determine the target position. FIG. 3 shows a plurality of example target position templets for use with a positioning device according to the first aspect of the invention.

Fourth Embodiment

Figure 4:
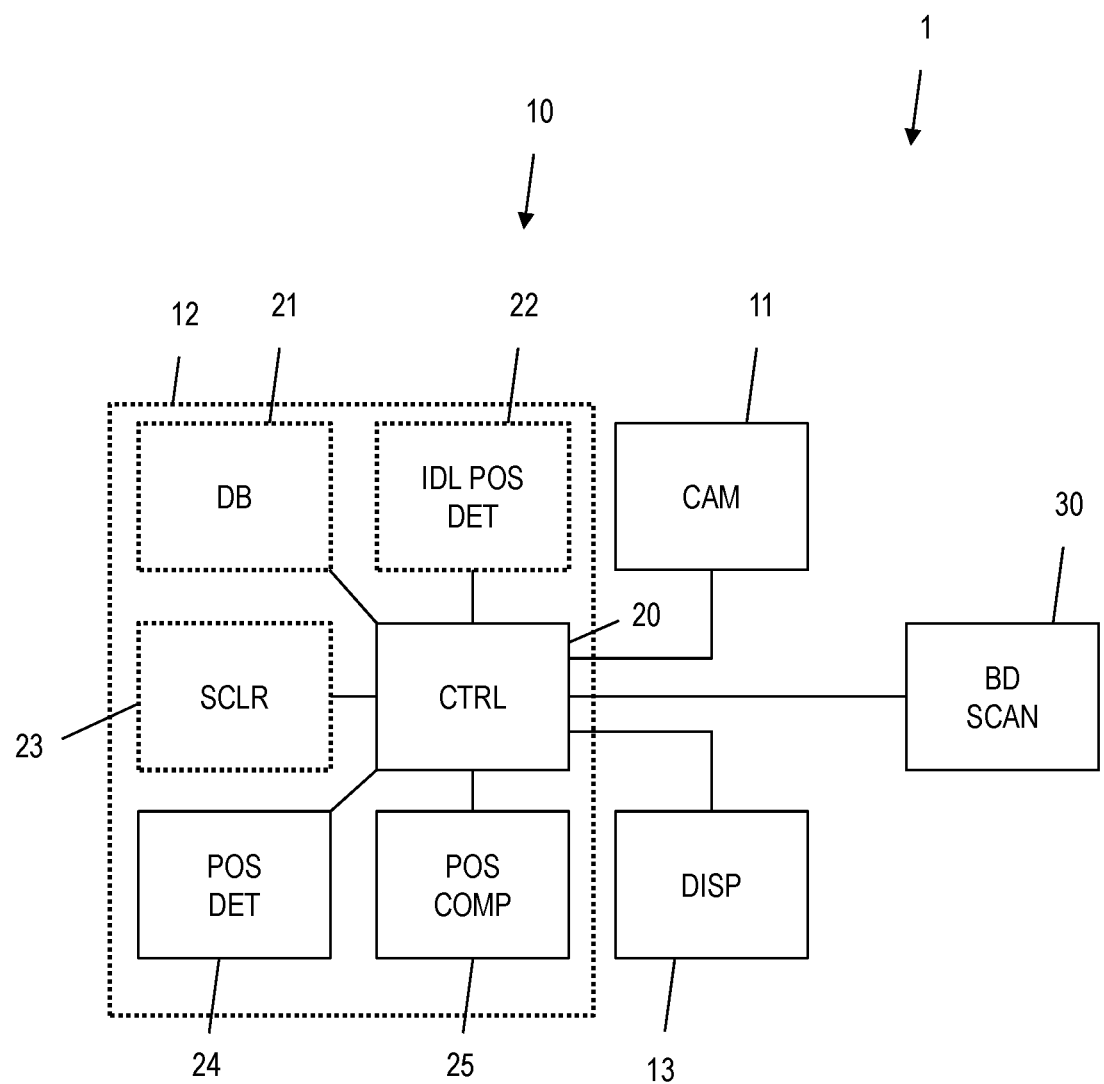
FIG. 4 shows a first embodiment of a body scanning system according to the second aspect of the invention.

FIG. 4 shows a first embodiment of a body scanning system 1 according to the second aspect of the invention, including an embodiment of the positioning device 10 according to the first aspect of the invention. The body scanning system 1 comprises a positioning device 10 and a body scanner 30. The positioning device 10 comprises a camera 11, a processing unit 12 and a display 13, as shown in FIG. 1 and FIG. 2. The camera 11, the display 13 and the body scanner 30 are each connected to the processing unit 12.

The processing unit 12 moreover comprises a controller 20, connected to a database 21, a target position determiner 22, a scaler 23, a position determiner 24, and a position comparer 25. The database 21, the target position determiner 22 and the scaler 23 are optional components. Further, the elements 22-25 may be implemented in one or more processors configured to perform the respective functions of the elements, where the respective functions of all (or one or more subsets) of the elements may be combined in any configuration of the one or more processors.

Although in practice there may exist additional direct connections between the elements 21-25, they are though not displayed here for reasons of clarity.

The controller 20 is adapted to control all connected units of the processing unit 12. Moreover, the controller 20 is adapted to control the camera 11 and the display 13.

When performing a scan of a person, the person enters the body scanner 30 or stands in front of it. The body scanner 30 then instructs the positioning device 10 to correctly position the person to be scanned. The person to be scanned therefore is the person to be positioned. The controller 20 now instructs the camera 11 to record an image of the person to be positioned. This image is handed from the camera 11 to the controller 20. The controller 20 hands the image to the position determiner 24, which determines a position of the person to be positioned from the image of the person to be positioned. This determined position is handed to the position comparer 25 either through a non-depicted direct connection or through the controller 20. The position comparer 25 compares the determined position of the person to a target posture or position and determines a difference between the determined position of the person and the target position. This difference is then displayed by the display 13. The display 13 either receives the information directly from the position comparer 25 or through the controller 20.

As long as the position of the person is not a match to the target position, the positioning continues. As soon as a match is detected though, the positioning device 10 has finished positioning the person to be scanned according to the instruction of the body scanner 30. The body scanner 30 then performs the body scan of the person to be scanned.

Figure 3:
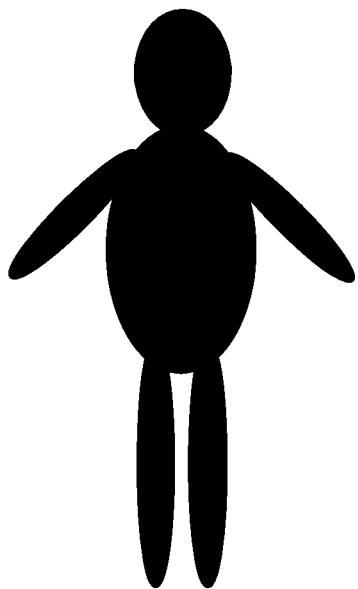
FIG. 3 shows example position templets for use with a positioning device according to the first aspect of the invention.
Figure 3:
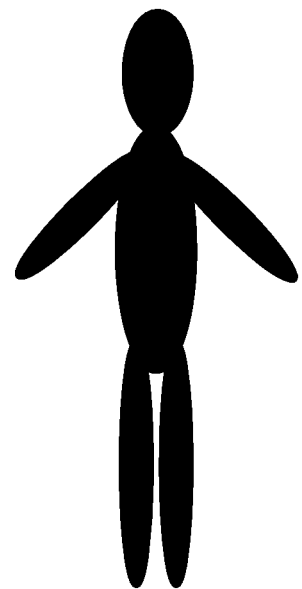
Figure 3:
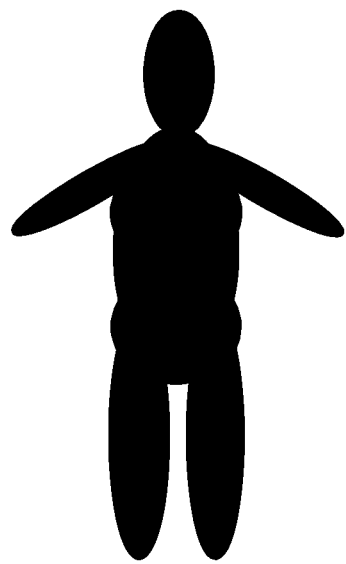
Figure 3:
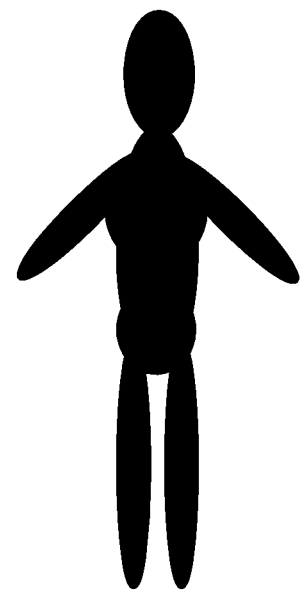

By way of example, the processing unit 12 comprises the database 21, which stores a plurality of target posture or position templets, as shown in FIG. 3. In this case, the positioning device additionally comprises the target position determiner 22, which compares the position determined by the position determiner 24 to the target position templets stored in the database 21 and selects a one of the target position templets for use by the position comparer 25 as the target position templet best matching the position determined by the position determiner 24.

By way of further example, the processing unit 12 comprises the scaler 23, which can perform a scaling of the determined posture or of the target position templets stored within the database 21 before the target position determiner 22 determines the desired target position. This allows for an even better match of the determined position to one of the target position templets. The thereby determined target position is then used by the position comparer 25, as explained before.

By way of further example, the display 13 is integrated into the body scanner 30. For example, it can be integrated into a scanning array of the body scanner 30. Also a separate positioning display in view of a person to be scanned while in the body scanner 30 can be used.

According to further embodiments, the body scanner 30 performs a number of scans of a person to be scanned in different positions. Therefore, after completing a scan of a person in a first position, the body scanner 30 instructs the positioning device 10 to position the person in a second position. The body scanner can then perform a second scan. This process can be repeated for as many positions as necessary. The body scanner 30 can also select the number of necessary scans dependent upon the quality of the resulting scans. If the body scanner for example determines that with the presently performed scans it is not possible to determine with sufficient accuracy, if prohibited items are present on the body of the person, the body scanner can instruct additional scans using positions that allow for an accurate scan especially of the so far problematic regions of the body of the person to be scanned.

In order to increase the cooperation of the person to be scanned, the display can also display the number of remaining positions, which need to be scanned. This can for example be done as a number. Also, with a small icon, the different positions to be assumed successively can be displayed.

Fifth Embodiment

Figure 5:
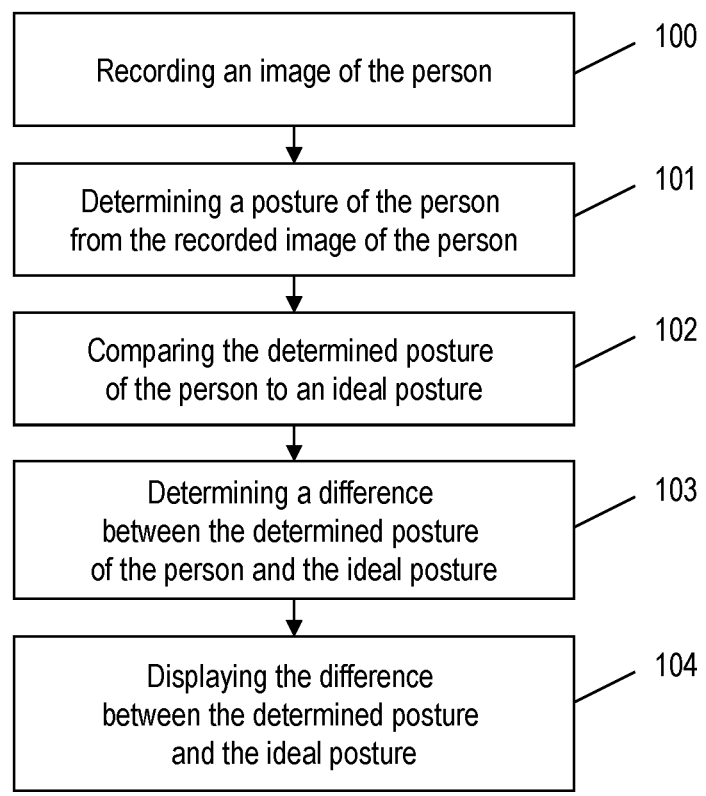
FIG. 5 shows a flow chart depicting an embodiment of a positioning method according to the third aspect of the invention.

FIG. 5 shows a flow chart depicting an embodiment of a positioning method according to the third aspect of the invention. In a first step 100, an image of a person is recorded. In a second step 101, a posture or position of the person is determined from the recorded image of the person. In a third step 102, the determined position is compared to a target posture or position. In a fourth step 103, a difference between the determined position of the person and the target position is determined. In a final fifth step 104, the difference between the determined position and the target position is displayed.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to specific types of body scanners. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A positioning device for positioning a person's body, comprising:
a camera adapted to record an image of the person's body without any devices placed on the person's body;
a processor adapted to determine a position of the person's body based on the recorded image of the person's body, to compare the determined position of the person's body to a target position based on the image of the person's body and a stored target position template, and to determine a difference between the determined position of the person's body and the target position based on the comparison;
a display adapted to display the difference between the determined position of the person's body and the target position; and
a database adapted to store a plurality of target position templates for different body shapes; and
wherein the processor is further configured to compare the determined position of the person's body to each of the plurality of target position templates stored in the database, and to determine the target position as a one of the target position templates that best matches the determined position of the person's body.

2. The positioning device according to claim 1, wherein the processor is further configured to, before comparing the determined position of the person's body to each of the plurality of target position templates, one of scale the determined position of the person's body to best match the target position templates of the plurality of target position templates, and scale the plurality of target position templates to best match the determined position of the person's body.

3. The positioning device according to claim 1, wherein the display is one of a liquid crystal display, a light emitting diode display, an organic light emitting diode display, a holographic display and a projected image display.

4. The positioning device according to claim 1, wherein the display is integrated into a semi-transparent mirror, arranged so that the person can see his or her reflection in the semi-transparent mirror while seeing the determined difference between the determined position of the person's body and the target position.

5. The positioning device according to claim 1, wherein the processor is further adapted to:
determine if the determined difference between the determined position of the person's body and the target position is smaller than a threshold or larger than the threshold;
determine a posture match, when the determined difference between the determined position of the person's body and the target position is smaller than the threshold; and
determine a posture mismatch, when the determined difference between the determined position of the person's body and the target position is larger than the threshold.

6. The positioning device according to claim 5, wherein the display is adapted to:
display a first symbol in a case of a position match; and
display a second symbol in a case of a position mismatch.

7. The positioning device according to claim 5, wherein the display is adapted to:
display the image of the person's body;
display the target position;
display one of an outline of the image of the person's body and an outline of the target position in a first color, in a case of a position match; and
display one of an outline of the image of the person's body and an outline of the target position in a second color, in a case of a position mismatch.

8. The positioning device according to claim 5, wherein the display is adapted to:
display an outline of the image of the person's body in a first color, in a case of a position match; and display the determined difference between the determined position of the person's body and the target position, in a second color, in a case of a position mismatch.

9. A body scanning system for scanning a person, comprising:
a scanner device adapted to scan the person; and
a positioning device comprising (i) a camera adapted to record an image of the person's body without any devices placed on the person's body, (ii) a processor adapted to determine a position of the person's body based on the recorded image of the person's body, to compare the determined position of the person's body to a target position based on the image of the person's body and a stored target position template, and to determine a difference between the determined position of the person's body and the target position based on the comparison, (iii) a display adapted to display the difference between the determined position of the person's body and the target position, and (iv) a database adapted to store a plurality of target position templates for different body shapes; and
wherein the target position is configured as a desired position for the person's body in order to achieve an optimal scan of the person by the scanner device, and
wherein the processor is further configured to compare the determined position of the person's body to each of the plurality of target position templates stored in the database, and to determine the target position as a one of the target position templates that best matches the determined position of the person's body.

10. The body scanning system according to claim 9, wherein the display is integrated into a scan array of the scanner device.

11. The body scanning system according to claim 9, wherein the display is arranged so that it is visible from a position of the person being scanned.

12. The body scanning system according to claim 9, wherein the scanner device is adapted to:
control the positioning device to successively position the person's body in a number of different positions; and
scan the person in each of the number of different positions; and
wherein the positioning device is adapted to successively position the person's body in each of the number of different positions, as instructed by the body scanner, by using a respective target position for each of the number of different positions.

13. The body scanning system according to claim 12, wherein the display is adapted to display a remaining number of the number of different positions.

14. A method for positioning a person's body, comprising:
recording, via a camera device, an image of the person's body without any devices placed on the person's body;
determining, by one or more processors, a position of the person's body based on the recorded image of the person's body;
comparing the determined position of the person's body to a target position based on the image of the person's body and a stored target position template;
determining a difference between the determined position of the person's body and the target position based on the comparison;
displaying the difference between the determined position of the person's body and the target position; and
comparing the determined position of the person's body to each of a plurality of target position templates for different body shapes stored in a database, and to determine the target position as a one of the target position templates that best matches the determined position of the person's body.

* * * * *